US010202233B2

(12) United States Patent
Patel et al.

(10) Patent No.: US 10,202,233 B2
(45) Date of Patent: Feb. 12, 2019

(54) METHOD OF MAKING AN AEROSOL CONTAINER

(71) Applicant: Graham Packaging Company, L.P., York, PA (US)

(72) Inventors: Tapan Y. Patel, Nashua, NH (US); Thomas E. Nahill, Amherst, NH (US); Stephen R. Guerin, Milford, NH (US)

(73) Assignee: Graham Packaging Company, L.P., Lancaster, PA (US)

( * ) Notice: Subject to any disclaimer, the term of this patent is extended or adjusted under 35 U.S.C. 154(b) by 520 days.

(21) Appl. No.: 14/945,949

(22) Filed: Nov. 19, 2015

(65) Prior Publication Data

US 2016/0075502 A1 Mar. 17, 2016

Related U.S. Application Data

(62) Division of application No. 13/031,877, filed on Feb. 22, 2011, now Pat. No. 9,221,596.

(51) Int. Cl.
*B65D 83/38* (2006.01)
*B29C 49/00* (2006.01)
(Continued)

(52) U.S. Cl.
CPC .............. *B65D 83/38* (2013.01); *B29C 49/00* (2013.01); *B29C 49/20* (2013.01);
(Continued)

(58) Field of Classification Search
CPC .. B65D 83/38; B65D 41/0471; B65D 1/0246; B29C 49/00; B29C 49/20; B29C 49/56;
(Continued)

(56) References Cited

U.S. PATENT DOCUMENTS 3,774,810 A 11/1973 Corsette
3,787,547 A * 1/1974 Stephen .............. B29C 49/0073
264/249
(Continued)

FOREIGN PATENT DOCUMENTS

CN 101460390 6/2009
EP 0403259 12/1990
(Continued)

OTHER PUBLICATIONS

U.S. Appl. No. 13/031,877 (U.S. Pat. No. 9,221,596), filed Feb. 22, 2011 (Dec. 29, 2015).
(Continued)

*Primary Examiner* — Sarang Afzali
(74) *Attorney, Agent, or Firm* — Baker Botts L.L.P.

(57) ABSTRACT

An aerosol container includes a main body portion that is constructed and arranged to withstand aerosol pressurization within a range that is about 90-180 psig and a threaded finish portion that is unitary with the main body portion. The threaded finish portion has at least one helical thread, a support ledge beneath the helical thread and a secondary flange that is positioned beneath the support ledge. The secondary flange has an outer circumference that is noncircular in at least one location, whereby it may be engaged during a capping operation to prevent rotation of the container during capping. A method of making an aerosol container in which a preform is capped before the blow molding process is also disclosed.

8 Claims, 7 Drawing Sheets

(51) Int. Cl.
  *B65D 1/02* (2006.01)
  *B65D 41/04* (2006.01)
  *B29C 49/20* (2006.01)
  *B29C 49/42* (2006.01)
  *B29C 49/56* (2006.01)
  *B29K 67/00* (2006.01)
  *B29K 105/00* (2006.01)
  *B29L 31/00* (2006.01)

(52) U.S. Cl.
  CPC .......... *B29C 49/4205* (2013.01); *B29C 49/56* (2013.01); *B65D 1/0246* (2013.01); *B65D 41/0471* (2013.01); *B29K 2067/003* (2013.01); *B29K 2105/258* (2013.01); *B29L 2031/7142* (2013.01); *Y10T 29/4998* (2015.01)

(58) Field of Classification Search
  CPC ......... B29C 49/4205; B29L 2031/7142; B29K 2105/258; B29K 2067/003; Y10T 29/4998
  See application file for complete search history.

(56) References Cited

U.S. PATENT DOCUMENTS

| | | | |
|---|---|---|---|
| 3,910,442 | A | 10/1975 | Gargano |
| 4,361,256 | A | 11/1982 | Corsette |
| 4,671,436 | A | 6/1987 | Hagan |
| 4,898,708 | A | 2/1990 | Holoubek et al. |
| 4,939,890 | A | 7/1990 | Peronek et al. |
| 4,984,717 | A | 1/1991 | Burton |
| 5,218,811 | A | 6/1993 | LaPlante et al. |
| 5,462,182 | A | 10/1995 | Opresco |
| 5,678,711 | A | 10/1997 | Tobias |
| 5,803,281 | A | 9/1998 | Towns |
| 5,833,085 | A * | 11/1998 | Valyi ............... B29B 11/04 215/44 |
| 5,836,364 | A | 11/1998 | Burton |
| 6,588,627 | B2 | 7/2003 | Petterson et al. |
| 6,612,464 | B2 | 9/2003 | Petterson et al. |
| 6,698,160 | B2 | 3/2004 | Peronek et al. |
| 6,923,343 | B1 | 8/2005 | Erxleben |
| D581,272 | S | 11/2008 | Yourist et al. |
| 2002/0148800 | A1 | 10/2002 | Ozawa et al. |
| 2004/0238475 | A1 | 12/2004 | Peronek |
| 2005/0127022 | A1 | 6/2005 | Flashinski et al. |
| 2006/0060554 | A1 | 3/2006 | Garman |
| 2007/0245538 | A1 | 10/2007 | Salameh |
| 2009/0236244 | A1 | 9/2009 | Frutin |
| 2009/0321286 | A1 | 12/2009 | Frutin |
| 2010/0012532 | A1 | 1/2010 | Frutin |
| 2011/0017701 | A1 | 1/2011 | Soliman |
| 2011/0101036 | A1 | 5/2011 | Wanbaugh et al. |
| 2011/0174827 | A1 | 7/2011 | Patel et al. |
| 2012/0211457 | A1 | 8/2012 | Patel et al. |
| 2012/0211458 | A1 | 8/2012 | Patel et al. |

FOREIGN PATENT DOCUMENTS

| | | |
|---|---|---|
| FR | 2582509 | 12/1986 |
| FR | 2 846 946 | 5/2004 |
| GB | 1224940 | 3/1971 |
| GB | 2 205 614 | 12/1988 |
| JP | A-S61-47363 | 3/1986 |
| JP | A 2008-247412 | 10/2008 |
| WO | WO 2004/007291 | 1/2004 |

OTHER PUBLICATIONS

U.S. Appl. No. 13/031,883 (U.S. Pat. No. 8,935,904), filed Feb. 22, 2011 (Jan. 20, 2015).
U.S. Appl. No. 14/571,654 (US 2015/0102071), filed Dec. 16, 2014 (Apr. 16, 2015).
U.S. Appl. No. 13/031,877, Nov. 20, 2015 Issue Fee Payment.
U.S. Appl. No. 13/031,877, Aug. 20, 2015 Notice of Allowance.
U.S. Appl. No. 13/031,877, Aug. 10, 2015 Amendment and Request for Continued Examination (RCE).
U.S. Appl. No. 13/031,877, Jun. 9, 2015 Examiner's Answer to Appeal Brief.
U.S. Appl. No. 13/031,877, Dec. 15, 2014 Appeal Brief Filed.
U.S. Appl. No. 13/031,877, Oct. 15, 2014 Notice of Appeal Filed.
U.S. Appl. No. 13/031,877, Sep. 24, 2014 Advisory Action.
U.S. Appl. No. 13/031,877, May 15, 2014 Final Office Action.
U.S. Appl. No. 13/031,877, Feb. 5, 2014 Response to Non-Final Office Action.
U.S. Appl. No. 13/031,877, Nov. 5, 2013 Non-Final Office Action.
U.S. Appl. No. 13/031,877, Oct. 14, 2013 Response to Restriction Requirement.
U.S. Appl. No. 13/031,877, Sep. 13, 2013 Restriction Requirement.
U.S. Appl. No. 13/031,883, Feb. 5, 2014 Non-Final Office Action.
U.S. Appl. No. 13/031,883, Oct. 14, 2013 Response to Restriction Requirement.
U.S. Appl. No. 13/031,883, Sep. 13, 2013 Restriction Requirement.
U.S. Appl. No. 13/031,883, May 5, 2014 Response to Non-Final Office Action.
U.S. Appl. No. 13/031,883, May 28, 2014 Final Office Action.
U.S. Appl. No. 13/031,883, Aug. 28, 2014 Response after Final Office Action.
U.S. Appl. No. 13/031,883, Sep. 12, 2014 Examiner Initiated Interview Summary.
U.S. Appl. No. 13/031,883, Sep. 12, 2014 Notice of Allowance.
U.S. Appl. No. 13/031,883, Dec. 12, 2014 Issue Fee Payment.
U.S. Appl. No. 14/571,654, Nov. 10, 2015 Response to Non-Final Office Action.
U.S. Appl. No. 14/571,654, Aug. 10, 2015 Non-Final Office Action.
CN Office Action dated Apr. 3, 2015 in CN Patent Application No. 201180066412.
JP Office Action dated Sep. 1, 2015 in JP Patent Application No. 2013-554445.

\* cited by examiner

METHOD OF MAKING AN AEROSOL CONTAINER

CROSS-REFERENCE TO RELATED APPLICATIONS

This application is a divisional of U.S. patent application Ser. No. 13/031,877 filed Feb. 22, 2011, now U.S. Pat. No. 9,221,596, which is incorporated by reference herein in its entirety.

BACKGROUND OF THE INVENTION

1. Field of the Invention

This invention relates broadly to the field of containers that are adapted to hold highly pressurized contents, such as aerosol mixtures, and more particularly to a blow molded plastic aerosol container having a finish portion that is constructed and arranged to provide maximum resistance to deformation and stress cracking at high internal pressures.

2. Description of the Related Technology

Aerosol containers have conventionally been fabricated from metal, and are conventionally formed as a cylindrical tube having upper and lower end closures. The bottom end closure is typically shaped as a concave dome, and the upper end closure typically includes a manually actuatable valve for dispensing the pressurized aerosol contents of the container.

Metallic containers have certain inherent disadvantages, such as a tendency to rust over time and to scratch surfaces with which they may come into contact.

Efforts have been made in the past to develop plastic aerosol containers, but have encountered difficulties, mainly relating to controlling the deformation of the plastic material as a result of the significant internal pressurization that is necessary in an aerosol container. Aerosol containers commonly require internal pressures of the magnitude of 50-300 psi, which is significantly greater than pressures that are typically encountered in other packaging applications for which plastic material has been used, such as the packaging of carbonated beverages. Accordingly, design considerations for plastic aerosol containers are quite different than they are for lower pressure packaging applications such as plastic beverage containers.

One common type of plastic container is fabricated from a material such as polyethylene terephthalate (PET) and is manufactured from an injection molded preform having a threaded finish portion using the reheat stretch blow molding process. While such containers hold some promise for aerosol applications, they are susceptible to stress cracking in the finish portion while under pressurization. In addition, the finish portion of such containers has a tendency to deform when the container is pressurized, possibly resulting in a loss of sealing integrity between the container and the aerosol dispensing closure.

A plastic aerosol container that utilizes a threaded finish portion also requires application of an aerosol dispensing closure to the finish portion at a torque that may be greater than that used for the application of closures to conventional, non-aerosol containers. Conventional capping machines may be unable to generate such torque without causing undesired rotation of the container.

A need exists for an improved blow molded plastic aerosol container that is less susceptible to stress cracking and deformation in the finish region than are conventional blow molded containers. A need also exists for a plastic aerosol container that can have an aerosol dispensing closure applied thereto at higher torques without rotation of the container.

SUMMARY OF THE INVENTION

Accordingly, it is an object of the invention to provide an improved blow molded plastic aerosol container that is less susceptible to stress cracking and deformation in the finish region than are conventional blow molded containers.

It is further an object of the invention to provide a plastic aerosol container that can have an aerosol dispensing closure applied thereto at higher torques without rotation of the container.

In order to achieve the above and other objects of the invention, an aerosol container according to a first aspect of the invention includes a main body portion containing an aerosol mixture having an aerosol propellant. The container further includes a threaded finish portion that is unitary with the main body portion. The threaded finish portion has at least one helical thread, a support ledge beneath the helical thread and a secondary flange that is positioned beneath the support ledge. The secondary flange has an outer circumference that is noncircular in at least one location, whereby it may be engaged during a capping operation to prevent rotation of the container during capping.

A method of assembling an aerosol container according to a second aspect of the invention includes steps of providing a container having a threaded finish portion, a support ledge positioned beneath the threaded finish portion and a secondary flange positioned beneath the support ledge. The secondary flange has at least one noncircular portion. A method further includes a step of preventing rotation of the container by engaging the noncircular portion of the secondary flange, and screwing at least a portion of an aerosol dispensing closure assembly onto the threaded finish portion at a torque that is within a range of about 15 in-lbs to about 50 in-lbs. The container is then pressurized with an aerosol mixture having an aerosol propellant.

A method of making an aerosol container according to a third aspect of the invention includes steps of providing a preform having a threaded finish portion, a support ledge positioned beneath the threaded finish portion and a secondary flange positioned beneath the support ledge, the secondary flange having at least one noncircular portion; preventing rotation of the preform by engaging the noncircular portion of the secondary flange; screwing at least a portion of an aerosol dispensing closure assembly onto the threaded finish portion of the preform; and blow molding an aerosol container from the preform.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
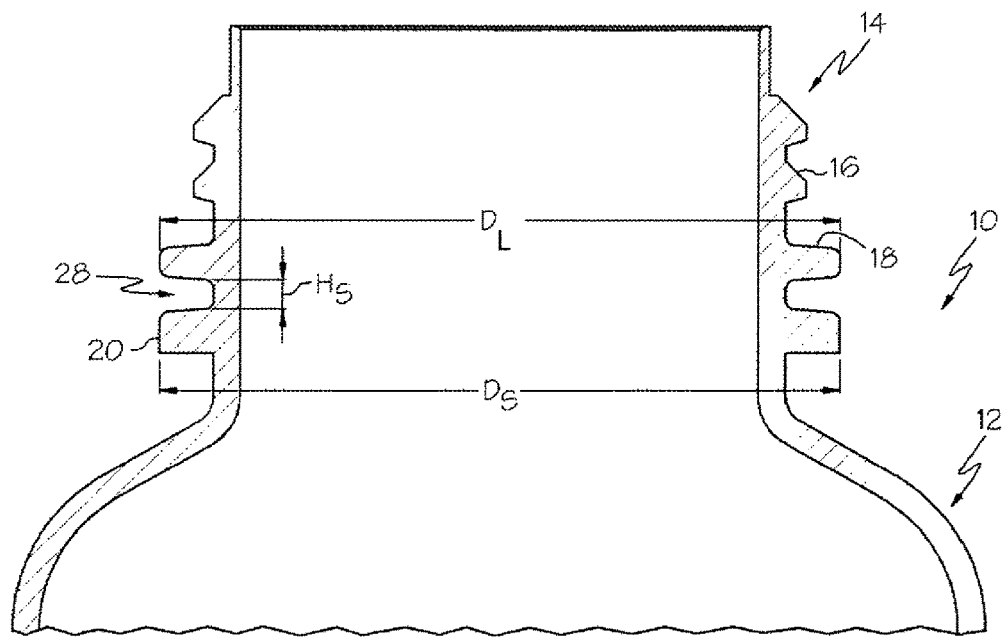
FIG. 1 is a fragmentary cross-sectional view taken along lines 1-1 in FIG. 2.
Figure 2:
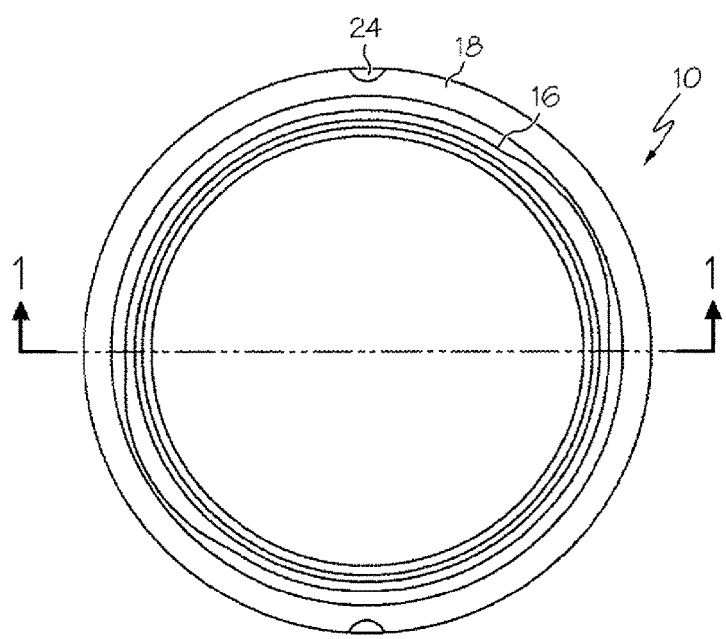
FIG. 2 is a top plan view of an aerosol container assembly that is constructed according to a preferred embodiment of the invention.

Referring now to the drawings, wherein like reference numerals designate corresponding structure throughout the views, and referring in particular to FIG. 1, an aerosol container assembly that is constructed according to a preferred embodiment of the invention includes a plastic aerosol container 10 having a main body portion 12 that is constructed and arranged to withstand aerosol pressurization within a range of about 50 psig to about 300 psig. More preferably, the main body portion 12 is constructed and arranged to withstand aerosol pressurization within a range of about 90 psig to about 180 psig.

Plastic aerosol container 10 is preferably fabricated from a plastic material such as polyethylene terephthalate (PET), polyethylene naphthalate (PEN), acrilonitrile (AN), polycarbonate (PC), polyamide (Nylon), or a blend containing some combination of the same from a plastic preform using a conventional blow molding process such as the reheat stretch blow molding process. In the preferred embodiment, container 10 is fabricated from a high intrinsic viscosity polyethylene terephthalate material, which most preferably has an intrinsic viscosity that is substantially within a range of about 0.76 to about 0.95.

Container 10 preferably has an average wall thickness in the main body portion 12 that is substantially within a range of about 0.018 inch to about 0.022 inch, permitting it to withstand aerosol pressures.

The aerosol container 10 further includes a threaded finish portion 14 that is unitary with the main body portion 12 and that has at least one helical thread 16 defined thereon for receiving an aerosol dispensing closure. Finish portion 14 further includes a support ledge 18 beneath the helical thread 16, which is used to help convey the container 10 during manufacture and filling. The support ledge 18 has a first maximum outer diameter $D_L$, as is best shown in FIG. 1.

The support ledge 18 is preferably constructed so that it has a substantially circular circumference as viewed in top plan. In the preferred embodiment, the outer circumference of the support ledge 18 includes a pair of small recesses 24, which are used for registering the position of the container 10 during the capping process, in which an aerosol dispensing closure is applied to the finish portion 14.

The threaded finish portion 14 further includes at least one secondary flange 20, which is positioned beneath the support ledge 18. The secondary flange 20 is preferably constructed so that it has an outer circumference that is noncircular in at least one location, so that it may be engaged during a capping operation to prevent rotation of the container 10 during capping.

Figure 9:
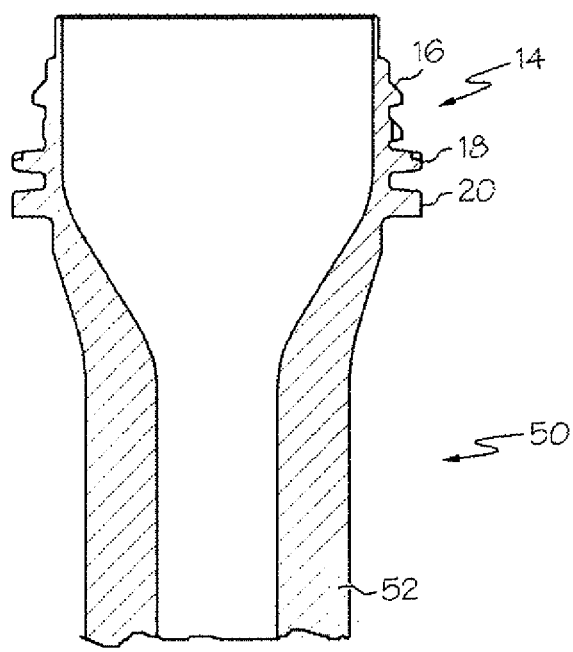
FIG. 9 is a cross-sectional view taken through a preform that is constructed according to the preferred embodiment of the invention.

The secondary flange 20 in the preferred embodiment is fabricated using an injection molding process together with the rest of a plastic preform 50, shown in FIG. 9, which is used to manufacture the aerosol container 10 using a reheat stretch blow molding process. The plastic preform 50 includes a body portion 52.

Figure 7:
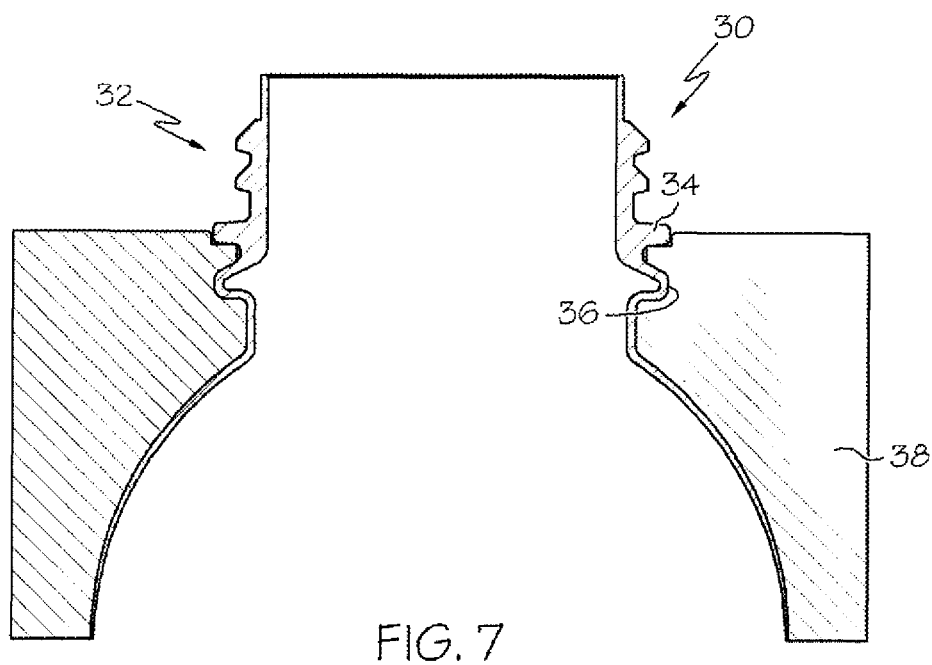
FIG. 7 is a diagrammatical view depicting the manufacture of an aerosol container according to an alternative embodiment of the invention.

In an alternative embodiment of the invention, shown in FIG. 7, a blow molded aerosol container 30 includes a threaded finish portion 32 having a support ledge 34 and a secondary flange 36. In this embodiment, the secondary flange 36 is fabricated during the blow molding process through the use of a mold 38, and is not part of the preform that is used to manufacture the container 30.

In another alternative embodiment of the invention, anti-rotation features could be incorporated into the support ledge of the finish portion without the provision of a secondary flange. For example, the support ledge could be provided with two or more flat surfaces, grooves or notches on the underside of the support ledge or one or more lugs or notches on the top surface of the support ledge.

The secondary flange 20 is preferably constructed so as to have a second maximum outer diameter $D_S$, which is not substantially greater than the first maximum outer diameter $D_L$ of the support ledge 18. Preferably, the second maximum outer diameter $D_S$ of the secondary flange 20 is substantially the same as the first maximum outer diameter $D_L$ of the support ledge 18.

Figure 3:
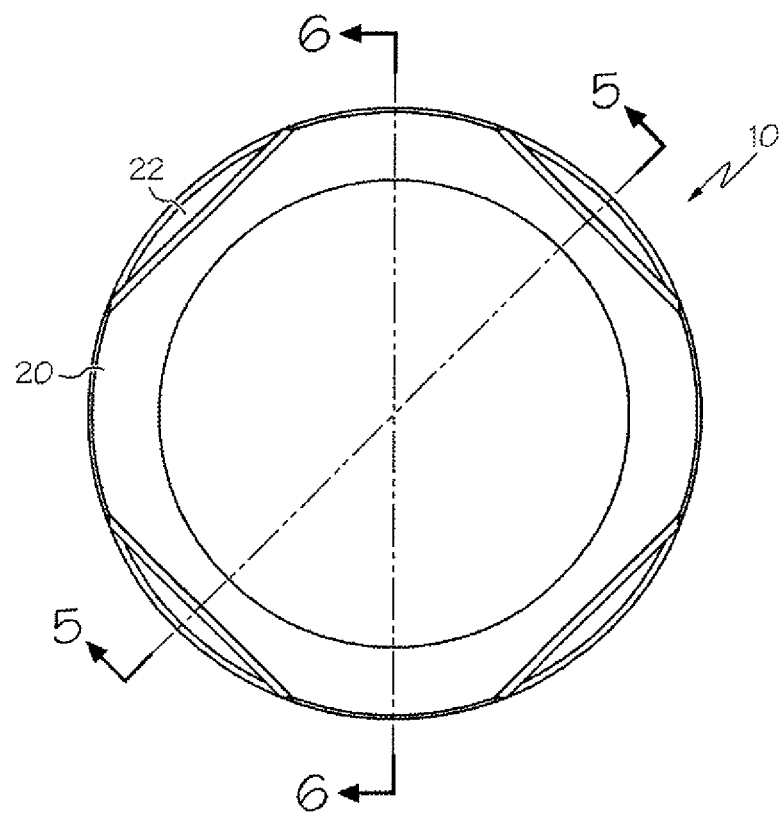
FIG. 3 is a bottom plan view of the aerosol container assembly that is shown in FIG. 2.
Figure 4:
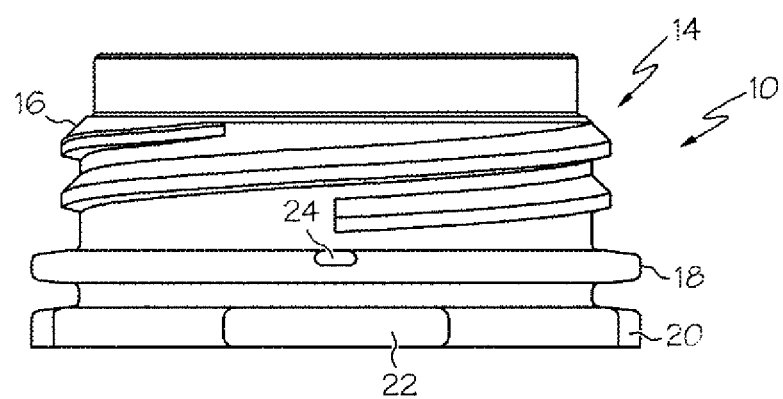
FIG. 4 is a side elevational view of the finish portion of the aerosol container assembly that is shown in FIG. 2.
Figure 5:
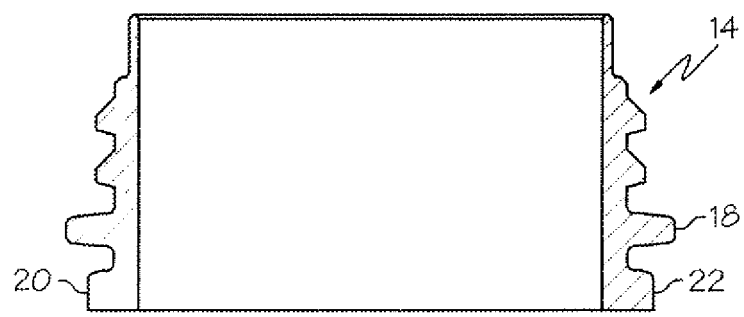
FIG. 5 is a cross-sectional view taken along lines 5-5 in FIG. 3.
Figure 6:
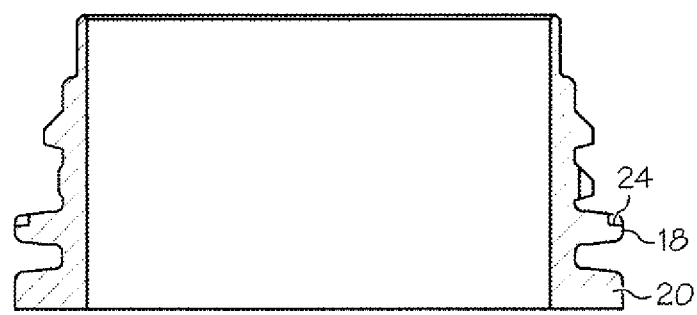
FIG. 6 is a cross-sectional view taken along lines 6-6 in FIG. 3.

Preferably, the secondary flange 20 has at least one substantially flat portion defined thereon that may be engaged by a capping machine in order to prevent relative rotation of the container 10 with respect to the capping machine during the capping process. As is best shown in FIG. 3, the secondary flange 20 preferably has four flat portions 22 that are evenly spaced around the circumference of the secondary flange 20.

An annular space 28 is defined between the support ledge 18 and the secondary flange 20. Annular space 28 has a minimum vertical dimension $H_S$ that is preferably at least about 1 mm, and that is more preferably at least about 1.5 mm.

Figure 8:
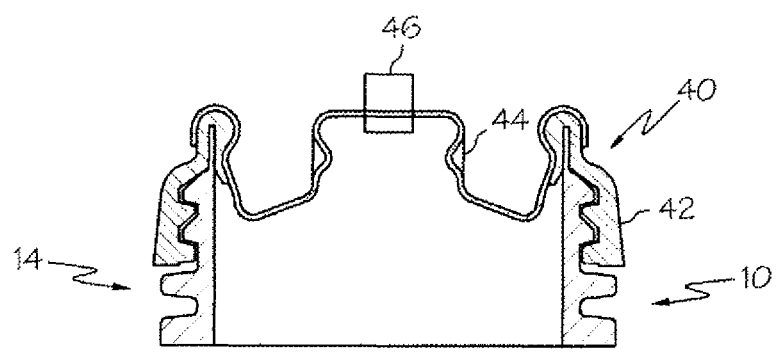
FIG. 8 is a diagrammatical view depicting an aerosol closure assembly according to the preferred embodiment of the invention.

The aerosol container assembly further includes an aerosol dispensing closure assembly 40, which is diagrammatically shown in FIG. 8. The aerosol dispensing closure assembly 40 includes an apron or collar 42 that is adapted to be threaded onto and sealed to the threaded finish portion 14. Securing structure is preferably provided in order to prevent the consumer from unscrewing the aerosol dispensing closure assembly 40 from the container 10, which in the preferred embodiment is a glue that is applied to collar 42 of the aerosol dispensing closure assembly 40 and the finish portion 14.

The aerosol dispensing closure assembly 40 also preferably includes a metallic insert 44 mounted on the collar 42 having a central opening in which an aerosol dispensing valve 46 is positioned.

Figure 10:
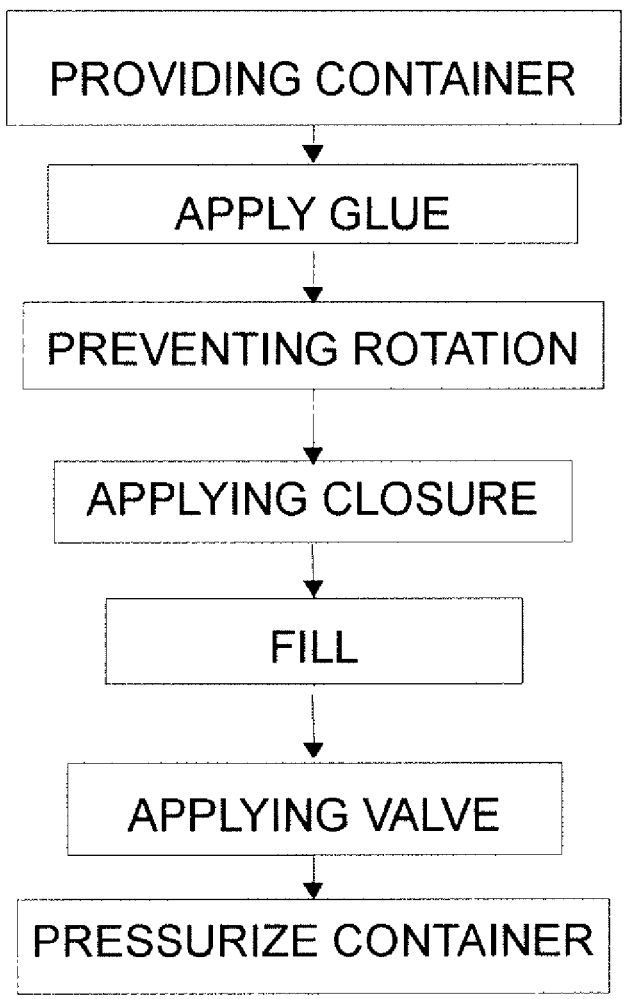
FIG. 10 is a flowchart depicting a method according to the preferred embodiment of the invention.

A method of assembling an aerosol container assembly according to the preferred embodiment of the invention is diagrammatically shown in FIG. 10 and includes providing a container 10 as described above having a threaded finish portion 14, a support ledge 18 positioned beneath the threaded finish portion and a secondary flange 20 positioned beneath the support ledge 18. The secondary flange 20 preferably has at least one noncircular portion.

The collar 42 of the aerosol dispensing closure assembly 40 is then screwed onto the threaded finish portion 14 using a commercial capping machine. During the capping process, the container 10 is secured against rotation relative to the capping machine by engagement of a portion of the capping machine with the noncircular portion of the secondary flange 20. The collar 42 of the aerosol dispensing closure 40 is preferably screwed onto the threaded finish portion at a torque that is substantially within a range of about 15 in-lbs to about 50 in-lbs. The container 10 is then filled with product, after which the metallic insert 44 of the aerosol dispensing closure assembly 40 is applied to the collar and the container is pressurized with an aerosol mixture at a range of pressurization that is substantially between about 50 psig to about 300 psig, and more preferably substantially within a range of about 90 psig to about 180 psig using known aerosol pressurization processes and equipment.

The aerosol mixture preferably includes a propellant, which could be a liquefied gas propellant or a compressed or soluble gas propellant. Liquefied gas propellants that could be used include hydrocarbon propellants such as propane, isobutene, normal butane, isopentane, normal pentane and dimethyl ether, and hydrofluorocarbon propellants such as difluoroethane (HFC-152a) and tetrafluoroethane (HFC-134a). Compressed and soluble gas propellants that could be used include carbon dioxide (CO2), nitrous oxide (N2O), nitrogen (N2) and compressed air.

Figure 11:
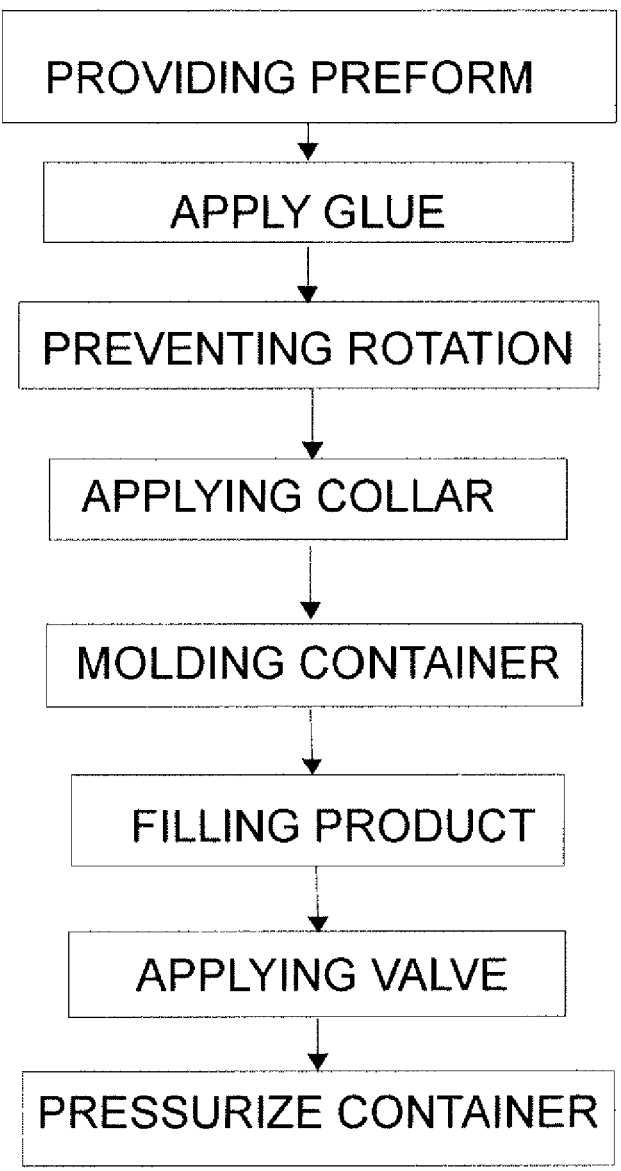
FIG. 11 is a flowchart depicting a method according to an alternative embodiment of the invention.

In an alternative embodiment that is depicted in FIG. 11, the collar 42 of the aerosol dispensing closure assembly 40 could be secured to the threaded finish portion 14 of the preform 50 prior to blow molding the container 10 and its main body portion 12. Securing structure is preferably provided in order to prevent the consumer from unscrewing the aerosol dispensing closure assembly 40 from the container 10, which in the preferred embodiment is a glue that is applied to the collar 42 and the finish portion 14.

During this preform capping process, the preform 50 is secured against rotation relative to the capping machine by engagement of a portion of the capping machine with the noncircular portion of the secondary flange 20, shown in FIG. 9. The collar 42 is preferably screwed onto the threaded finish portion 14 of the preform 50 at a torque that is substantially within a range of about 15 in-lbs to about 50 in-lbs.

The container 10 is then blow molded and filled with product, including the aerosol mixture. The container 10 is subsequently pressurized.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making an aerosol container, comprising:
providing a preform having a threaded finish portion having at least one helical thread, a support ledge positioned beneath the threaded finish portion, the support ledge having at least one position-registering recess defined therein, and a secondary flange positioned beneath the support ledge, the secondary flange having an outer circumference that is noncircular in at least one location;
preventing rotation of the preform by engaging, with a capping machine, the noncircular portion of the secondary flange;
screwing at least a portion of an aerosol dispensing closure assembly onto the threaded finish portion of the preform; and
blow molding the preform to form the aerosol container.

2. The method according to claim 1, wherein a space is defined between the support ledge and the secondary flange, and the space has a minimum vertical dimension that is at least about 1 mm.

3. The method according to claim 2, wherein the minimum vertical dimension is at least about 1.5 mm.

4. The method according to claim 1, wherein the support ledge has a first maximum outer diameter and the secondary flange has a second maximum outer diameter, and wherein the second maximum outer diameter is substantially the same as the first maximum outer diameter.

5. The method according to claim 1, wherein the support ledge has a first maximum outer diameter and the secondary flange is a second maximum outer diameter, and wherein the second maximum outer diameter is not substantially greater than the first maximum outer diameter.

6. The method according to claim 1, wherein the secondary flange has at least one substantially flat portion defined thereon.

7. The method according to claim 1, further comprising securing the aerosol dispensing closure against rotation with respect to the container by applying a securement means.

8. The method according to claim 1, wherein the threaded finish portion and the main body portion are fabricated from a material comprising polyethylene terephthalate.

* * * * *